F. W. CARPENTER.
Axle-Lubricator.

No. 200,985.   Patented March 5, 1878.

WITNESSES
Henry N. Miller
John Schroeder

INVENTOR
Francis W. Carpenter

Alexander Mason
ATTORNEYS

UNITED STATES PATENT OFFICE.

FRANCIS W. CARPENTER, OF HARRISON, NEW YORK.

IMPROVEMENT IN AXLE-LUBRICATORS.

Specification forming part of Letters Patent No. 200,985, dated March 5, 1878; application filed May 17, 1877.

*To all whom it may concern:*

Be it known that I, FRANCIS W. CARPENTER, of Harrison, in the county of Westchester, and in the State of New York, have invented certain new and useful Improvements in Lubricators; and do hereby declare that the following is a full, clear, and exact description thereof, reference being had to the accompanying drawings, and to the letters of reference marked thereon, making a part of this specification.

The nature of my invention consists in the construction and arrangement of a lubricator for wheels for vehicles or other places where the same may be applied, as will be hereinafter more fully set forth.

In order to enable others skilled in the art to which my invention appertains to make and use the same, I will now proceed to describe its construction and operation, referring to the annexed drawings, in which—

Figure 1:
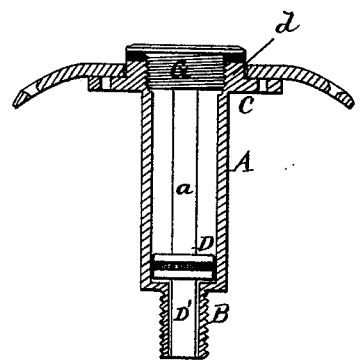
Figure 2:
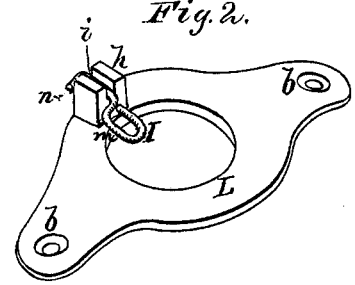

Figure 1 is a longitudinal section of my improved lubricator, and Fig. 2 is a perspective view of the cap or fastening device.

A represents a tube of any suitable dimensions, provided at its inner end with a nipple, B, having exterior screw-threads. This tube is, further, near its upper end, provided with a plate or flange, C, projecting all around the same. To insert this tube in the hub of a wheel, a hole is bored through the hub, and a smaller one through the box, which latter hole has female screw-threads for the nipple B to screw into. D represents a piston, packed in any suitable manner to fit tightly the interior of the tube A, and provided with a stem, a, projecting upward through the tube, and a point, D', extending downward into the nipple B.

In supplying oil to the spindle the piston D is withdrawn, the cylinder A filled with oil. The tightly-fitting piston is then inserted again in the tube or cylinder, and as it is pressed down into the tube the oil is forced down into the hub around the spindle. The point D' of the piston enters the nipple B, to prevent the latter from becoming clogged.

The upper end of the stem a is provided with a screw-head, G, which screws into the upper end of the tube A. This screw-head, however, is immaterial, as I provide a plate, L, to prevent any upward movement of the piston. This plate L has a central circular opening, and fits on top of the tube or cylinder A, as shown.

The plate L is provided with perforated ears b b, through which screws are passed for fastening the same to the hub. It has also on one side a grooved lug, h, through which is passed a spring-pin, I. The inner end of this pin extends over the head of the stem a, to prevent the same from coming out.

The spring-pin I is formed with a loop, m, as shown in Fig. 2, which, when turned to one side, prevents the working out of the pin. When, however, this loop is turned upward, the groove i in the lug h admits of the pin being taken out, when the piston can be removed for putting in more oil; or the loop may remain upward, when the end n thereof will catch on the outer side of the lug and prevent the pin from coming out.

The point D' forms a very essential feature of my invention in connection with the tight-fitting piston. This point D' extends clear to the end of the nipple, and prevents said nipple from becoming clogged. If the nipple were clogged, the piston could not force the oil through when it became necessary to force oil to the spindle.

I do not broadly claim a lubricator in which an extended point is used, and closely fits the hollow of a nipple, to prevent clogging; nor do I claim a lubricator in which a piston is used, as I am aware that such have been known before; but,

Having thus fully described my invention, I claim as new and desire to secure by Letters Patent—

1. The tube A, provided with nipple B at its lower end, and flange or rim at the top, and having its inner walls smooth and parallel from the top to the shoulder formed by the nipple, in combination with the stem a, having a piston-head, D, of a size equal to the size of the tube, and having an extended point, D', to fit the nipple, and a head for connecting to the top of the tube, all substantially as and for the purposes herein set forth.

2. The plate L, provided with ears $b\ b$, and the perforated and grooved lug $h$, in combination with the spring-pin I, provided with the loop $m$, substantially as and for the purposes set forth.

In testimony that I claim the foregoing I have hereunto set my hand this 26th day of April, 1877.

FRANCIS W. CARPENTER.

Witnesses:
JOHN E. MARSHALL,
J. M. MASON.